(12) United States Patent
Deolalikar

(10) Patent No.: US 9,230,015 B2
(45) Date of Patent: Jan. 5, 2016

(54) DERIVING AN INTERESTINGNESS MEASURE FOR A CLUSTER

(71) Applicant: HEWLETT-PACKARD DEVELOPMENT COMPANY, L.P., Houston, TX (US)

(72) Inventor: Vinay Deolalikar, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 150 days.

(21) Appl. No.: 13/933,657

(22) Filed: Jul. 2, 2013

(65) Prior Publication Data

US 2015/0012540 A1 Jan. 8, 2015

(51) Int. Cl.
*G06F 17/30* (2006.01)
*G06F 7/00* (2006.01)

(52) U.S. Cl.
CPC ............................. *G06F 17/30705* (2013.01)

(58) Field of Classification Search
CPC .................. G06F 17/30705; G06F 17/3071
See application file for complete search history.

(56) References Cited

U.S. PATENT DOCUMENTS

| | | | |
|---|---|---|---|
| 8,219,593 B2 | 7/2012 | Tunkelang | |
| 2004/0172600 A1* | 9/2004 | Evans | 715/517 |
| 2007/0100824 A1* | 5/2007 | Richardson et al. | 707/7 |
| 2009/0082997 A1 | 3/2009 | Tokman | |
| 2011/0029532 A1* | 2/2011 | Knight | G06F 17/30713 707/737 |
| 2011/0125751 A1* | 5/2011 | Evans | 707/737 |
| 2012/0330969 A1* | 12/2012 | Estrada Guadarrama et al. | 707/748 |
| 2013/0132364 A1* | 5/2013 | Udupa | G06Q 30/0251 707/709 |
| 2014/0214825 A1* | 7/2014 | Zhang et al. | 707/732 |

OTHER PUBLICATIONS

Tijl De Bie, Subjectively Interesting Alternative Clusters, Sep. 2011 (12 pages).
Kelvin Sim et al., Abstract, Data Mining and Knowledge Discovery, Mar. 2013, vol. 26, Issue 2, A survey on enhanced subspace clustering (2 pages).
Xuan-Hiep Huynh et al., A graph-based clustering approach to evaluate interestingness measures : a tool and a comparative study, 2007 (27 pages).
Aggarwal, C. C. and Yu, P. S. (1998), A new framework for itemset generation (7 pages).
Agrawal, R. and Srikant, R. (1994), Fast algorithms for mining association rules in large databases, Proceedings of the 20th VLDB Conference Santiago, Chile, 1994 (13 pages).
Agrawal, R., Imielinski, T., and Swami, A. (1993), Mining association rules between sets of items in large databases. SIGMOD Rec., 22(2) (10 pages).
Brijs, T., Vanhoof, K., and Wets, G. (2003), Defining interestingness for association rules, In Int. journal of information theories and applications, vol. 10 (6 pages).
Brin, S., Motwani, R., Ullman, J. D., and Tsur, S. (1997), Dynamic itemset counting and implication rules for market basket data (10 pages).

(Continued)

*Primary Examiner* — Sangwoo Ahn
(74) *Attorney, Agent, or Firm* — Trop, Pruner & Hu, P.C.

(57) ABSTRACT

Groups of connected concepts are identified for a cluster. At least one interestingness measure is computed for each of the groups of connected concepts in the cluster. An interestingness measure for the cluster is derived based on the interestingness measures for the corresponding groups of connected concepts.

14 Claims, 3 Drawing Sheets

(56) References Cited

OTHER PUBLICATIONS

Dom, B. E. (2002). An information-theoretic external cluster-validity measure, In Proceedings of the Eighteenth conference on Uncertainty in artificial intelligence, UAI'02 (9 pages).

Geng, L. and Hamilton, H. J. (2006), Interestingness measures for data mining: A survey, ACM Comput. Surv., 38(3) (32 pages).

Halkidi, M., Batistakis, Y., and Vazirgiannis, M. (2001), On clustering validation techniques (38 pages).

Hilderman, R. J. and Hamilton, H. J. (1999), Knowledge discovery and interestingness measures: A survey (27 pages).

IBM (1996), IBM Intelligent Miner for OS/390 Version 1 Discovers the Hidden Value in Your Data, Version 1, Release 1 (13 pages).

McGarry, K. (2005), A survey of interestingness measures for knowledge discovery. The knowledge engineering review (24 pages).

Padmanabhan, B. and Tuzhilin, A. (1998). A belief-driven method for discovering unexpected patterns. In Agrawal, R., Stolorz, P. E., and Piatetsky-Shapiro, G., editors, KDD (7 pages).

Padmanabhan, B. and Tuzhilin, A. (1999), Unexpectedness as a measure of interestingness in knowledge discovery (30 pages).

Piatetsky-Shapiro, G. (1991), Citation and Abstract, Knowledge Discovery in Databases (1 page).

Rand, M. M. . (2012), Where the money goes: Understanding litigant expenditures for producing electronic discovery (159 pages).

Silberschatz, A. and Tuzhilin, A. (1996), What makes patterns interesting in knowledge discovery systems. Knowledge and Data Engineering (13 pages).

Silverstein, C., Brin, S., and Motwani, R. (1998), Beyond market baskets: Generalizing association rules to depen-dence rules. Data Min. Knowl. Discov. (30 pages).

\* cited by examiner

DERIVING AN INTERESTINGNESS MEASURE FOR A CLUSTER

BACKGROUND

Data mining is performed to find interesting patterns in data. In some cases, data mining involves performance of clustering of data contained in a dataset, where the clustering produces multiple clusters. It can be time consuming to perform analysis of a large number of clusters.

BRIEF DESCRIPTION OF THE DRAWINGS

Some implementations are described with respect to the following figures.

DETAILED DESCRIPTION

Figure 1:
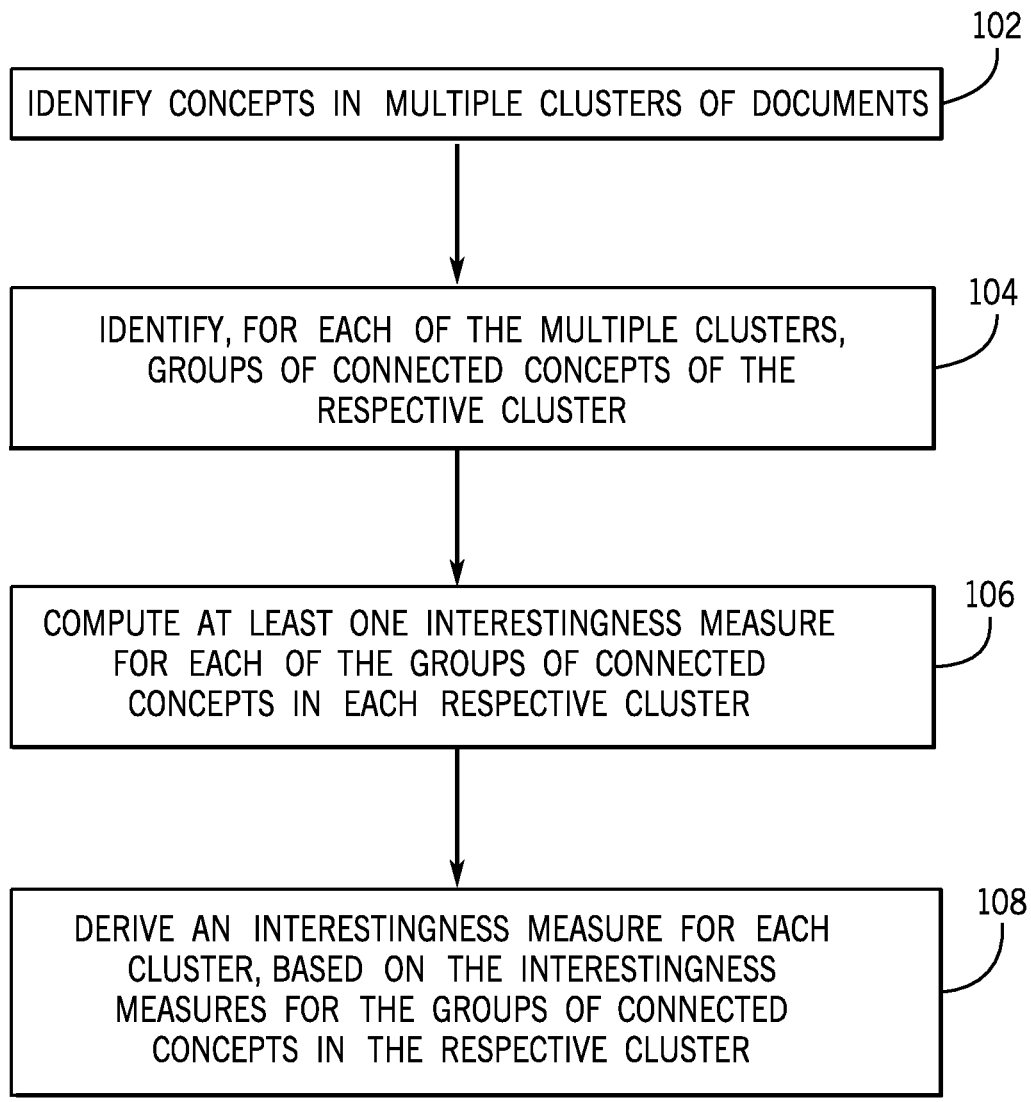
FIGS. 1 and 2 are flow diagrams of example processes according to various implementations.

Clustering of documents in a collection produces multiple clusters of documents. If the collection is a large collection, then a large number of clusters may be identified. Manually reviewing all clusters to perform analysis may be time consuming and may lead an analyst to miss some interesting clusters.

Some clusters are expected clusters that help organize data in a dataset, but does not provide more insight into the data. For example, consider a clustering of a collection of news articles. Clustering of the news articles may identify a cluster relating to the 2012 U.S. presidential elections. However, such a cluster is an expected cluster. Although this cluster helps to organize the collection of news articles, it may not provide any additional insight to a user. On the other hand, a cluster that groups together multiple seemingly disparate events may yield insight in the sense that there is potentially an unexpected connection between disparate events. For example, a cluster that groups news articles regarding a particular presidential candidate and other news articles relating to certain property investments may be unexpected (and thus interesting).

As another example, clustering may be performed as part of discovery in litigation. Document review during the discovery stage of litigation can involve review of a very large number of documents. A discovery tool may perform clustering of the litigation documents. During the early stages of discovery, a reviewer often is not specifically looking to answer a specific question, but rather desires to uncover unexpected associations in the documents.

As another example, as part of clustering performed in data mining of documents in an enterprise (e.g. business concern, government agency, educational organization, etc.), the enterprise may wish to identify one or multiple clusters that associate concepts that the enterprise would not have expected. Simply showing a reviewer a list of clusters, most of which are clusters of similar documents, may not lead to the insight desired by the enterprise.

In accordance with some implementations, interestingness measures are computed for clusters of documents identified by a clustering tool. These interestingness measures can be objective measures of interestingness that can enable user(s) to identify the cluster(s) that contain interesting patterns. Interestingness can refer to a quality that is attractive or arouses the attention of a target audience, including one or multiple users, machines, and so forth. The interestingness of a cluster can differ in different contexts and can differ based on a target objective of the target audience.

A cluster of documents can include associations of concepts. In some implementations, the less likely an association between concepts, the more interesting the association is. A concept can be represented as a set of terms, where a term can include a word, a portion of a word, or a phrase. More generally, a term can refer to any piece of information that is contained in documents of a collection. A document is a container of information, such as in the form of a file, an object, a portion of a file or object, or any other representation. Each document can include a number of terms.

FIG. 1 is a flow diagram of a process according to some implementations. The process of FIG. 1 identifies (at 102) concepts in multiple clusters of documents, where the clusters were produced by a clustering tool. The clustering performed by the clustering tool can be according to any of various clustering techniques, such as a K-means clustering technique, a hierarchical clustering technique, a distribution-based clustering technique, and so forth.

Each document of a cluster includes terms. Concepts can be identified by identifying respective sets of the terms. For example, a first concept may be represented by terms $\{a, b, c, d\}$, while a second concept may be represented by terms $\{x, y, a\}$.

The process of FIG. 1 further identifies (at 104), for each of the multiple clusters, groups of connected concepts of the respective cluster. Connected concepts can be concepts that share at least one term. In other implementations, concepts can be considered connected using other association indications. In some implementations, a group of connected concepts can be a pair of connected concepts (e.g. a pair that includes concept A that is connected to concept B).

The process then computes (at 106) at least one interestingness measure for each of the groups of connected concepts in each respective cluster. The process then derives (at 108) an interestingness measure for each cluster, based on the interestingness measures for the corresponding groups of connected concepts in the respective cluster. For example, if a given cluster has N groups of connected concepts (where N>1) that are associated with N corresponding interestingness measures, then the interestingness measure for the given cluster is an aggregate of the N interestingness measures for the N groups of connected concepts. The aggregate can be a maximum, a minimum, an average, a mean, a sum, or other aggregate of the N interestingness measures.

The following describes examples of different associations of data.

Consider a group of documents placed into a cluster by a clustering tool. Take for example, a cluster on U.S. politics. Consider the concept represented by the set of terms "GOP, Republican, election," which frequently co-occur in documents on politics. The clustering tool will likely map this concept to the cluster on U.S. politics. In this sense, the clustering tool has mapped a concept to a specific cluster. By doing so, the clustering tool has grouped together documents that contain a co-occurrence of these three terms. Such association of concepts to clusters is a Type 1 association.

In addition, the clustering tool can also capture relationships that exist across documents (namely, inter-document instead of intra-document relationships). For example, if another set of terms includes "Republican national convention, running mate, Tampa Fla., election," then the clustering tool will likely place such documents containing co-occurrence of these terms into the same cluster on U.S. politics as the above group of documents. At this stage, the clustering tool has associated two different sets of co-occurrences of terms: the clustering tool has discovered that the two term sets "GOP, Republican, election" and "Republican national convention, running mate, Tampa Fla., election" should be associated with each other. Such associations of concepts to each other are Type 2 associations.

Grouping together documents containing "GOP, Republican, election" (Type 1 association) is relatively easy. On the other hand, a Type 2 association across two concepts would not have been easily discovered without the clustering tool, and thus is harder to discover because the association represents non-local interactions within the data. A Type 2 association across concepts is also referred to as a connection between the concepts.

Unexpected connections between concepts can be considered interesting. In the foregoing examples, the term "election" is common between the two concepts. In other words, the clustering tool identified the connection between the two concepts through the common term "election."

The difficulty of finding such a connection between concepts can be based on frequency of occurrence of the common term. For example, if the term "election" is frequent, then it is easy to find this connection, and therefore associate the two concepts. If, on the other hand, the term "election" is infrequent, then finding the connection is harder. In accordance to some implementations, the interestingness of a connection between concepts can be expressed as follows. The more likely a connection between two concepts is, the less interesting the connection is. Conversely, an unlikely connection between concepts is more interesting. In some implementations, the likelihood of a connection between the concepts is based in part on the frequency of occurrence of the common term(s) that are present in the term sets representing the concepts.

The following provides further details regarding how interestingness measures can be computed for connected concepts and for clusters.

A dataset can include a document collection (or corpus) $D=\{D_1, \ldots, D_n\}$. A K-means clustering technique can identify K (K>1) clusters, which is represented as a K-cluster $C=\{C_1, \ldots, C_K\}$ of the document collection D. The K-cluster is a partition of D into K disjoint non-empty subsets whose union is D.

In sum examples, pre-processing of documents can be performed prior to clustering the documents. The pre-processing can include: tokenization of words (tokenization involves dividing a stream of text into words), stemming (reducing words to their roots, such as "breaking" or "broken" to the root "break"), removal of stop words (words such as "are", "the," "an" that occur very frequently), and removal of words occurring very infrequently (e.g. less than three times) in the document collection. The resulting set of tokens are referred to as terms. The vocabulary of D is the set of all terms in the documents of D. Sets of terms are referred to as itemsets, which are denoted by F, with subscripts when appropriate. The support of an itemset F in D, denoted by supp(F, D), is the set of all documents in D in which all the terms of F co-occur. Likewise, supp(F,C) is the set of all documents in the cluster C that contain all the terms of F.

In the discussion below, C is a generic cluster (any one of $C_1, \ldots, C_K$) in the K-cluster C. The following defines notions of "frequent," and "frequent" relative to C.

Let $\alpha$ be a positive integer that is called minimum support. F is said to be frequent (w.r.t $\alpha$) if the size of the support of F exceeds $\alpha$.

A frequent itemset F is said to be frequent relative to C if supp (F,C)>$\beta$supp(F,D), where $\beta$ is a threshold and 0<$\beta$<1.

Then F is said to be maximal frequent relative to C if F is the maximal (w.r.t. set intrusion) itemset with the preceding property. Stated differently, a maximal frequent itemset is a frequent itemset that is not contained in another frequent itemset.

In the ensuing discussion, "frequent" refers to "maximal frequent relative to a cluster C."

Let N(t,C) denote the number of times a term t appears, in total, in all the documents of cluster C. A norm can be defined for terms in clusters that takes into account the clustering structure. In some examples, the norm can be an $L_1$ norm, as explained below.

Let t be a term that occurs in C. The proportional $L_1$ norm of t with respect to C, denoted $\pi(t)$, is defined as $$\pi(t) = \frac{N(t, C)}{\sum_{t \in C} N(t, C)}.$$

Namely, the $L_1$ norm is the proportion of the number of times the term t appears in C to the total number of occurrences of all terms in C.

The set $C^{|l|}$ includes the l (where l>1) most frequent terms in C. Equivalently, these are the l terms having the highest proportional $L_1$ norm in C. The value of l can be a preconfigured number.

The maximal frequent itemsets of a cluster C can be denoted by $\mathcal{F}(C)=\{F_1, \ldots, F_q\}$, where q>1. However, in some implementations, to reduce computation burden, a smaller set of frequent itemsets is used, where the frequent itemsets from the smaller set includes just those terms that are taken from $C^{|l|}$. Accordingly, the set $\mathcal{F}(C^{|l|})$ is the set of frequent itemsets for C such that for all $F \in \mathcal{F}(C^{|l|})$, each term in F is from $C^{|l|}$.

In some examples, a cluster representation can be provided for each cluster. More specifically, a cluster representation of a cluster C, denoted R(C), can include one or some combination of the following data:

1. The terms in $C^{|l|}$, along with their proportional $L_1$ norms.
2. The maximal frequent itemsets $\mathcal{F}(C^{|l|})$.
3. An inverted index for terms in (1) and their occurrences in C, or the term-document matrix for terms in (1) restricted to documents in C.

Based on the foregoing, interestingness measures can be computed. In some example, there can be multiple types of interestingness measures: facet connection information, and facet entropy.

The following describes how a first type of interestingness measure, referred to as the facet connection information, is derived. A facet represents a pair of concepts that has at least one term in common. Note that each concept is represented by a respective maximal frequent itemset, as described above. More generally, a facet includes a pair (or other group) of concepts that are connected in some way.

Consider a pair of distinct maximal frequent itemsets ($F_i$, $F_j$) from $\mathcal{F}(C^{|l|})$, where this pair of distinct maximal frequent itemsets represent respective different concepts.

1. The connection between $F_i$ and $F_j$ is expressed as $$\chi_{i,j} = F_i \cap F_j. \quad \text{(Eq. 1)}$$

2. When $\chi_{i,j} \neq \emptyset$, ($F_i, F_j$) is called a facet of C. The set of facets of C is denoted by Fac(C).

Let ($F_i, F_j$)$\in$Fac(C) and $\chi_{i,j}$ be the corresponding connection.

The likelihood of the facet connection between $F_i$ and $F_j$ is defined as $$P(X_{i,j}) = \frac{\sum \{\pi(t): t \in X_{i,j}\}}{\sum \{\pi(t): t \in F_i \cup F_j\}}. \quad \text{(Eq. 2)}$$

The numerator in Eq. 2 represents the $L_1$ norm of documents in C that contain the terms common to $F_i$ and $F_j$. The denominator of Eq. 2 represents the total $L_1$ norm of documents in C that contain any of the terms in $F_i \cup F_j$.

Based on the likelihood of the facet connection, a different measure, referred to as a facet connection information, can be derived. Intuitively, the facet connection information for the facet $F_i$ and $F_j$ is a measure of the information content in the statement "$F_i$ and $F_j$ have $F_i \cap F_j$ in common." Information theory indicates us that the information content of a statement is the negative logarithm of the probability of that statement. In this case, the information content of a statement is the negative logarithm of the probability of the proposition $(\chi_{i,j} \subset F_1) \wedge (\chi_{i,j} \subset F_2)$.

From the foregoing, the facet connection information, denoted $FCI(F_i,F_j)$, of the facet $(F_i,F_j)$ (or of their connection $\chi_{i,j}$) is expressed as $$FCI(F_i,F_j) = -\log[P(\chi_{i,j})]. \quad \text{(Eq. 3)}$$

The facet connection information of Eq. 3 is an example of an interestingness measure of a group of connected concepts. In alternative examples, instead of using the facet connection information of Eq. 3, the likelihood measure of Eq. 2 can be used instead.

The following describes a different type of interestingness measure, referred to as a facet entropy. The facet entropy provides a measure of importance of a facet based on the importance of the underlying concepts in the facet. The importance of the facet is expressed as a weight of the facet, which is computed based on facet proportions, discussed below.

Let $(F_i,F_j) \in Fac(C)$. Define the proportion, $p_i$, as $$p_i = \frac{\sum \{\pi(t): t \in F_i\}}{\sum \{\pi(t): t \in F_i\} + \sum \{\pi(t): t \in F_j\}}, \quad \text{(Eq. 4)}$$

and the proportion $p_j$ similarly.

More intuitively, the facet entropy captures the information in the statement "the total weight of a facet is divided between the two constituent itemsets in the proportion $p_i : p_j$."

The facet entropy of $(F_i,F_j)$, denoted by $ENT(F_i,F_j)$, is expressed as $$ENT(F_i,F_j) = -[p_i \log(p_i) + p_j \log(p_j)]. \quad \text{(Eq. 5)}$$

The foregoing interestingness measures, including facet connection information (as expressed in Eq. 3) and the facet entropy (as expressed in Eq. 5) can be computed for each facet in a cluster C.

More generally, the facet connection information (as computed according to Eq. 3) provides an indication of how likely a connection is between concepts of a facet. An unexpected connection (a connection with a lower likelihood as computed according to Eq. 2) between two concepts is more interesting.

The facet entropy provides an indication of how important the two concepts of a facet are. A facet is considered more interesting if the two concepts are equally important, as expressed by the proportions computed according to Eq. 4.

The following describes an example process that employs the foregoing interestingness measures.

The cluster FCI for a cluster C, denoted by FCI(C), is calculated based on the FCI values computed for the facets (pairs of connected concepts) computed according to Eq. 3. In some implementations, the cluster FCI is expressed as:

$$FCI(C) = \max\{FCI(F_i,F_j) : F_i,F_j \in Fac(C)\} \quad \text{(Eq. 6)}$$

Likewise, the cluster ENT for C, denoted by ENT(C), is calculated based on the ENT values computed for the facets computed according to Eq. 5. In some implementations, the cluster ENT is expressed as:

$$ENT(C) = \max\{ENT(F_i,F_j) : F_i,F_j \in Fac(C)\} \quad \text{(Eq. 7)}$$

In each of Eqs. 6 and 7, the cluster interestingness measure, FCI(C) or ENT(C), is derived by selecting the maximum interestingness measure from among the interestingness measures computed for the facets of the cluster C. In other implementations, the cluster interestingness measure can be derived by computing another aggregate (e.g., minimum, average, mean, sum, etc.) of the interestingness measures for the facets of the cluster C.

The foregoing interestingness measures can be computed for each of multiple clusters. The clusters can then be ranked by the interestingness measures. In implementations where both the FCI(C) and ENT(C) measures are computed, two ranked lists of clusters can be derived: a first ranked list in which clusters are ranked according to the FCI(C) measures, and a second ranked list in which clusters are ranked according to the ENT(C) measures.

Given two ranked lists, $L_a(C)$ and $L_B(C)$, ranked by two scores a and b (where a can be FCI(C) while b can be ENT(C), for example), a rank aggregation technique can be applied, where the rank aggregation technique takes $L_a(C)$, $L_B(C)$ as inputs and produces a single ranked list L(C).

Rank aggregation refers generally to merging multiple ranked lists. The choice of rank aggregation technique to be applied can be application specific. For example, a simple rank aggregation technique would be to aggregate the ranked lists $L_a(C)$ (clusters ranked by a) and $L_B(C)$ (clusters ranked by b) by producing a single ranked list L(C) whose clusters are ranked by (a+b).

In alternative implementations, a rank aggregation technique can be made more computationally efficient by not ranking all the clusters, but only a subset of the clusters, such as those determined to be more interesting by some measure. For example, a Top-r-Intersection technique can be employed. Starting with r=1, the rank aggregation technique inspects the clusters in the Top-r sublists of both ranked lists $L_a(C)$ and $L_b(C)$. The Top-r sublist of a list includes the r cluster(s) in the list having the highest score(s). For example, the Top-r sublist of a list $L_a(C)$ includes the r cluster(s) in the list $L_a(C)$ having the highest a score(s).

The Top-r-Intersection technique increases r until there is a non-empty intersection of the two Top-r sublists. This non-empty intersection is returned as the single ranked list that merges the $L_a(C)$ and $L_b(C)$.

This following example pseudocode illustrates an example process.

| | Input: | Unordered Set of Document Clusters C = {$C_1, ..., C_k$} |
|---|---|---|
| | Result: | List of Document Clusters L(C), Ranked by Interestingness |
| 1 | for i in 1,..., K do | |
| 2 | compute R($C_i$); | |
| 3 | Call Compute_FCI_ENT(R($C_i$)); | |
| 4 | Compute FCI($C_i$); Compute ENT($C_i$); | |
| 5 | end | |

```
6  Construct Ranked List L_{FCI}(C);
7  Construct Ranked List L_{ENT}(C)
8  Aggregate Ranked Lists to Construct L(C);
9  return L(C)
```

Figure 2:
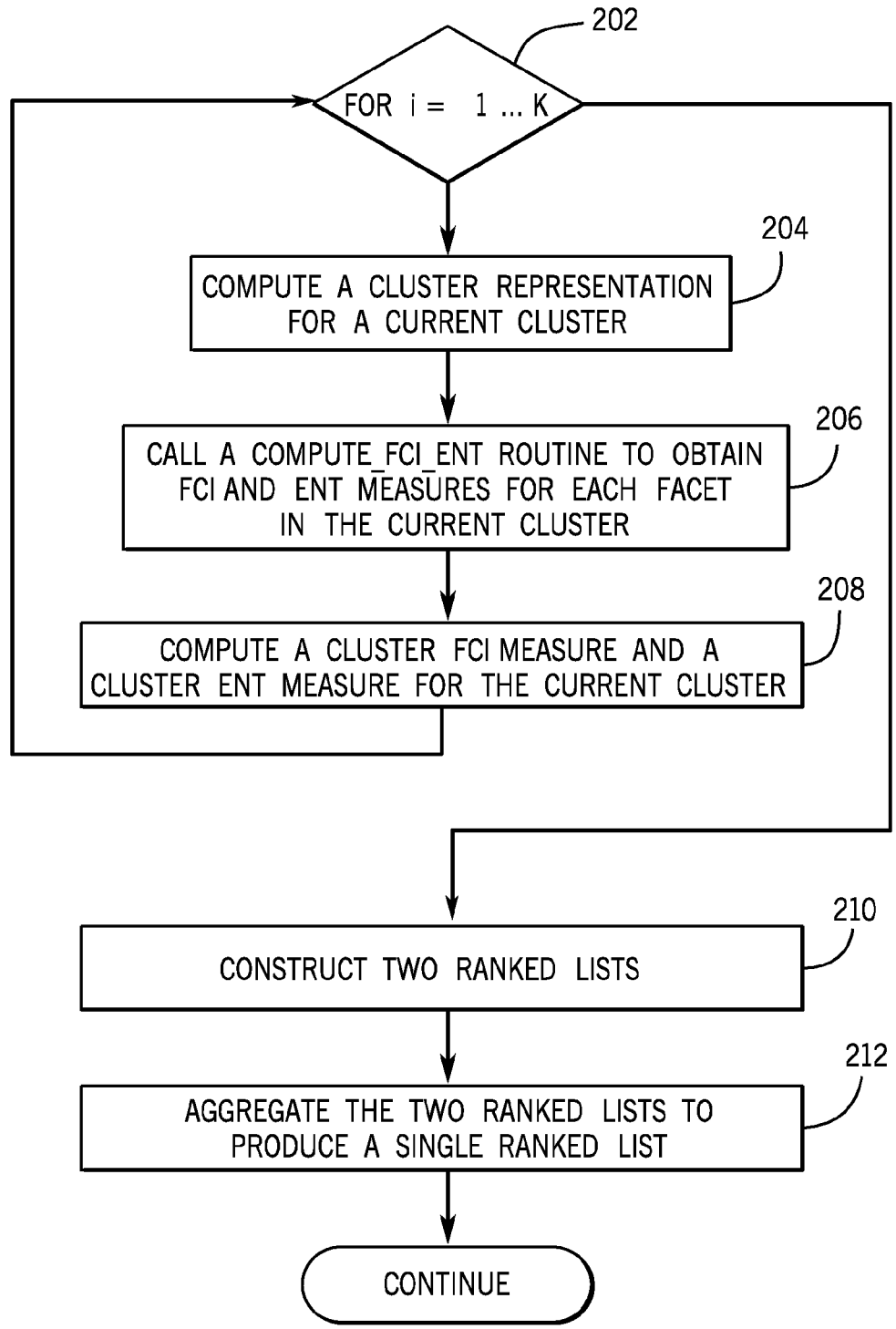

FIG. 2 is a flow diagram of the example process according to the above pseudocode. The process receives as input the clusters identified by a clustering tool. The process iterates through the K clusters at 202 (i in 1, . . . , K) (line 1 of the pseudocode). In a current iteration, the process computes (at 204) the cluster representation $R(C_i)$ (discussed above) for the current cluster $C_i$ (line 2 of the pseudocode).

The process then calls (at 206) a Compute_FCI_ENT routine, which obtains the FCI and ENT measures (calculated according to Eqs. 3 and 5) for each facet in the cluster $C_i$ (line 3 of the pseudocode). Next, the process computes (at 208) a cluster FCI measure and a cluster ENT measure (such as according to Eqs. 6 and 7, respectively) for the cluster $C_i$ (line 4 of the pseudocode).

Once all K clusters have been processed by the loop including tasks 204-208, the process can construct (at 210) two ranked lists: one ranked by descending order of cluster FCI measures, and the other similarly by cluster ENT measures (lines 6 and 7 of the pseudocode). The process finally aggregates (at 212) the two ranked lists to produce a single ranked list that captures the interestingness of the clusters (line 8 of the pseudocode). Clusters at the top of this single list are more interesting than those at the bottom.

Figure 3:
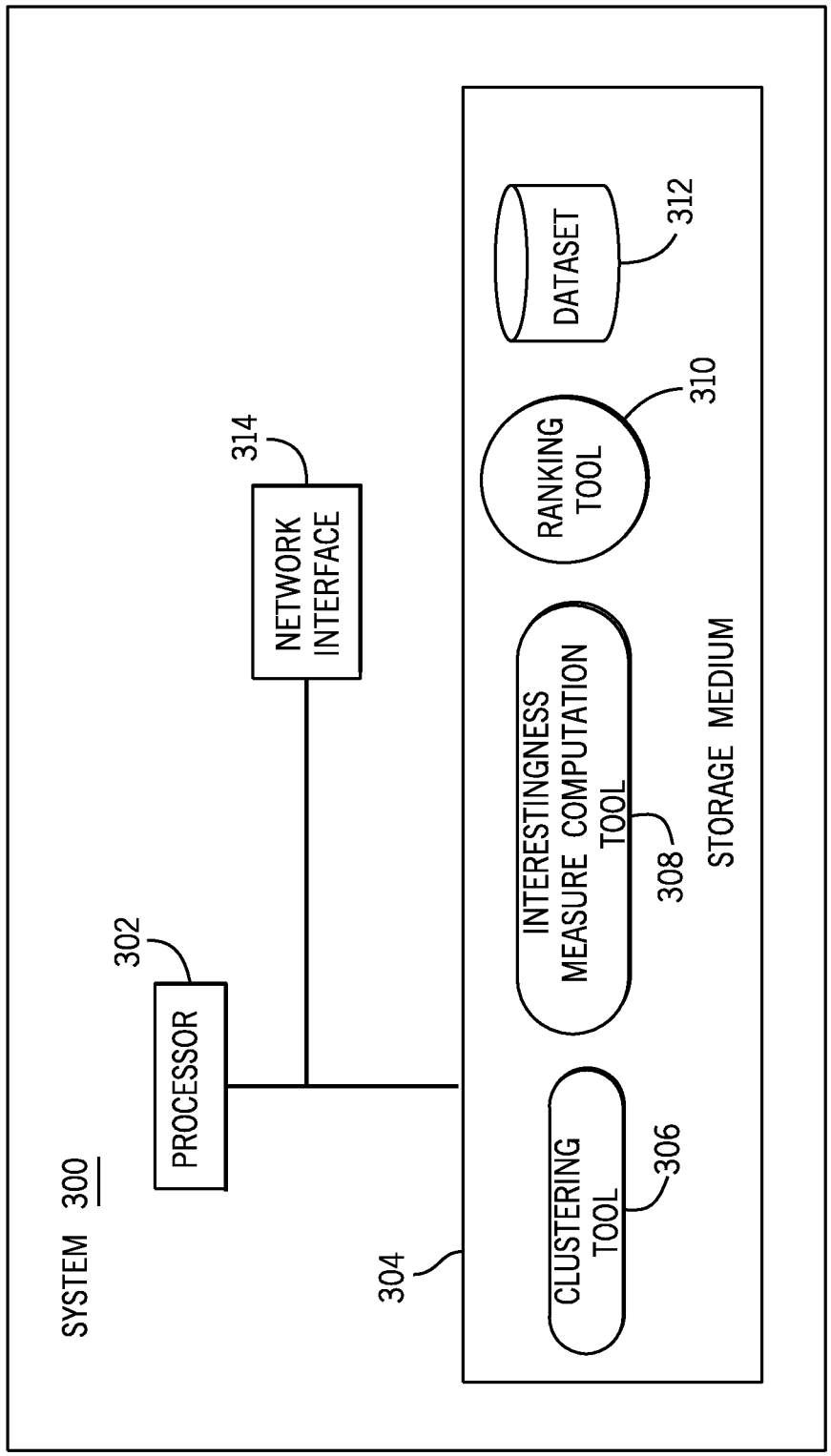
FIG. 3 is a block diagram of an example system incorporating some implementations.

FIG. 3 is a block diagram of an example system 300 according to some implementations. The system 300 can be a computer system, such as a server computer, a desktop computer, a notebook computer, a tablet computer, a personal digital assistant, a smartphone, and so forth. The system 300 can also include an arrangement of multiple computers.

The system 300 includes a processor (or multiple processors) 302, which can be coupled to a computer-readable or machine-readable storage medium (or multiple storage media) 304. A processor can include a microprocessor, microcontroller, processor module or subsystem, programmable integrated circuit, programmable gate array, or another control or computing device. The storage medium or storage media 304 can contain various tools and data, including a clustering tool 306, an interestingness measure computation tool 308, a ranking tool 310, and a dataset 312. The dataset 312 contains documents on which data mining is to be applied.

The clustering tool 306 performs clustering of the documents in the dataset 312, to produce clusters. The interestingness measure computation tool 308 computes interestingness measures for respective clusters, such as the interestingness measures discussed above. In some examples, the interestingness measure can perform the process of FIG. 1 or tasks 204-208 in the process of FIG. 2.

The ranking tool 310 uses the interestingness measures for the clusters to rank the clusters. In some examples, the ranking tool 310 can perform tasks 210 and 212 of FIG. 2. The ranking tool 310 can present an output to a user that identifies one or multiple clusters that are deemed to be most interesting. Alternatively, the ranking tool 310 can present the clusters along with their respective interestingness measures to allow a user to make the determination of which clusters are more interesting.

In alternative examples, some of the elements that are depicted as being stored in the storage medium (or storage media) 304 can be stored in a different system.

The processor(s) 302 can also be coupled to a network interface 314, to allow the system 300 to communicate over a data network with another system.

The storage medium or media 304 can include any of various different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   identifying, by a system having a processor, concepts in a plurality of clusters of documents;
   identifying, by the system for a first cluster of the plurality of clusters, groups of connected concepts of the first cluster;
   computing, by the system, interestingness measures for each of the groups of connected concepts in the first cluster, wherein computing the interestingness measures for each group of connected concepts comprises computing different types of interestingness measures, the different types of interestingness measures for a first group of connected concepts of the groups of connected concepts comprising a first type of interestingness measure representing a likelihood of a connection between the concepts of the first group of connected concepts, and a second type of interestingness measure representing an importance of the concepts of the first group of connected concepts;
   deriving, by the system, an interestingness measure for the first cluster based on the interestingness measures for the corresponding groups of connected concepts; and
   re-iterating the identifying of the groups of connected concepts, the computing, and the deriving for other clusters of the plurality of clusters, to produce respective interestingness measures for the other clusters.

2. The method of claim 1, further comprising:
   ranking the clusters of the plurality of clusters using the interestingness measures derived for the corresponding clusters.

3. The method of claim 1, further comprising:
   constructing a plurality of ranked lists of clusters, the plurality of ranked lists comprising:

a first ranked list of clusters ranked by the first type of interestingness measures, and a second ranked list of clusters ranked by the second type of interestingness measures.

4. The method of claim 3, further comprising:

aggregating the plurality of ranked lists to produce a single ranked list of clusters.

5. The method of claim 1, wherein computing the interestingness measures for a given group of the groups comprises:

computing proportions of corresponding concepts in the given group based on amounts of occurrences of terms in the corresponding concepts of the given group; and computing a weight of the given group using the computed proportions.

6. The method of claim 1, wherein each of the concepts is represented by a set of one or multiple terms.

7. The method of claim 1, wherein deriving the interestingness measure for the first cluster comprises computing an aggregate of the interestingness measures for the groups of connected concepts.

8. The method of claim 6, wherein each group of the groups of the connected concepts includes concepts having sets of terms that have at least one term in common.

9. A system comprising:

at least one processor to:

receive information relating to a plurality of clusters of documents, wherein the documents include concepts represented by terms in the documents;

identify, for each of the plurality of clusters, groups of connected concepts;

for each respective cluster of the plurality of clusters, compute interestingness measures for each respective group of the groups of connected concepts in the respective cluster, wherein computing the interestingness measures for each group of connected concepts comprises computing different types of interestingness measures, the different types of interestingness measures for a first group of connected concepts of the groups of connected concepts comprising a first type of interestingness measure representing a likelihood of a connection between the concepts of the first group of connected concepts, and a second type of interestingness measure representing an importance of the concepts of the first group of connected concepts; and for each respective cluster of the plurality of clusters, derive at least one interestingness measure for the respective cluster based on the interestingness measures for the corresponding groups of connected concepts in the respective cluster.

10. The system of claim 9, wherein the groups of connected concepts include pairs of connected concepts.

11. The system of claim 9, wherein the at least one processor is to rank the clusters according to the interestingness measures of the clusters.

12. The system of claim 9, wherein the at least one processor is to:

compute a plurality of ranked lists of clusters ranked according to different ones of the first and second types of interestingness measures.

13. An article comprising at least one non-transitory machine-readable storage medium storing instructions that upon execution cause a system to:

identify, for a cluster of documents, concepts that are connected, wherein each of the concepts includes a set of terms, and concepts are connected responsive to the respective sets of terms sharing at least one common term;

compute interestingness measures for each of respective groups of connected concepts in the cluster, the interestingness measures for a first group of connected concepts of the groups of connected concepts comprising a first type of interestingness measure representing a likelihood of a connection between the concepts of the first group of connected concepts, and a second type of interestingness measure representing an importance of the concepts of the first group of connected concepts;

derive an interestingness measure for the cluster by computing an aggregate of the interestingness measures for the respective groups of connected concepts; and re-iterate the identifying, the computing, and the deriving for other clusters to produce interestingness measures for the other clusters.

14. The article of claim 13, wherein the instructions upon execution cause the system to further:

rank the clusters according to the interestingness measures for the respective clusters.

* * * * *